United States Patent [19]

Ellis

[11] 4,398,981
[45] Aug. 16, 1983

[54] BRASSIERE PAD FABRICATION

[75] Inventor: Raymond J. Ellis, Northridge, Calif.

[73] Assignee: Olga Company, Van Nuys, Calif.

[21] Appl. No.: 240,002

[22] Filed: Mar. 3, 1981

[51] Int. Cl.³ .......................... A41C 3/00; B32B 31/04
[52] U.S. Cl. ...................................... 156/91; 128/463;
128/464; 128/481; 128/494; 128/514; 128/516;
128/517; 156/217; 156/245; 156/258; 156/263;
156/264; 156/313
[58] Field of Search ................... 156/60, 91, 211, 217,
156/242, 245, 258, 263, 264, 293, 304.1, 304.2,
306.6, 308.2, 313; 264/152, 241, 248, 258;
128/463, 464, 494, 514, 516, 517, 481

[56] References Cited

U.S. PATENT DOCUMENTS

| Re. 26,790 | 2/1970 | Silverman | 128/481 |
|---|---|---|---|
| 2,460,674 | 2/1949 | Bihaly | 2/267 |
| 2,505,458 | 4/1950 | Brauer | 2/267 |
| 2,507,755 | 5/1950 | Wilkenfeld et al. | 2/267 |
| 2,627,606 | 2/1953 | De Grandis | 128/481 |
| 3,064,329 | 11/1962 | Westberg et al. | 128/481 |
| 3,181,536 | 5/1965 | Cannata | 128/481 |
| 3,348,549 | 10/1967 | Brodmann et al. | 128/481 |
| 3,392,731 | 7/1968 | Silverman | 128/481 |
| 3,417,755 | 12/1968 | Howard et al. | 128/516 |
| 3,464,418 | 9/1969 | Silverman | 128/481 |
| 3,502,083 | 3/1970 | Howard et al. | 128/516 |
| 3,799,174 | 3/1974 | Howard | 128/464 |
| 3,947,207 | 3/1976 | Magidson et al. | 128/481 |

Primary Examiner—Caleb Weston
Attorney, Agent, or Firm—William W. Haefliger

[57] ABSTRACT

A brassiere pad is formed by providing two cones, each consisting of batting and having a seam extending from the cone apex to its periphery; nesting the cones to orient the seams in selected non-superposed position; and applying heat and pressure to the cones to effect their compression to final pad shape and interconnection through curing of a bonding agent.

6 Claims, 9 Drawing Figures

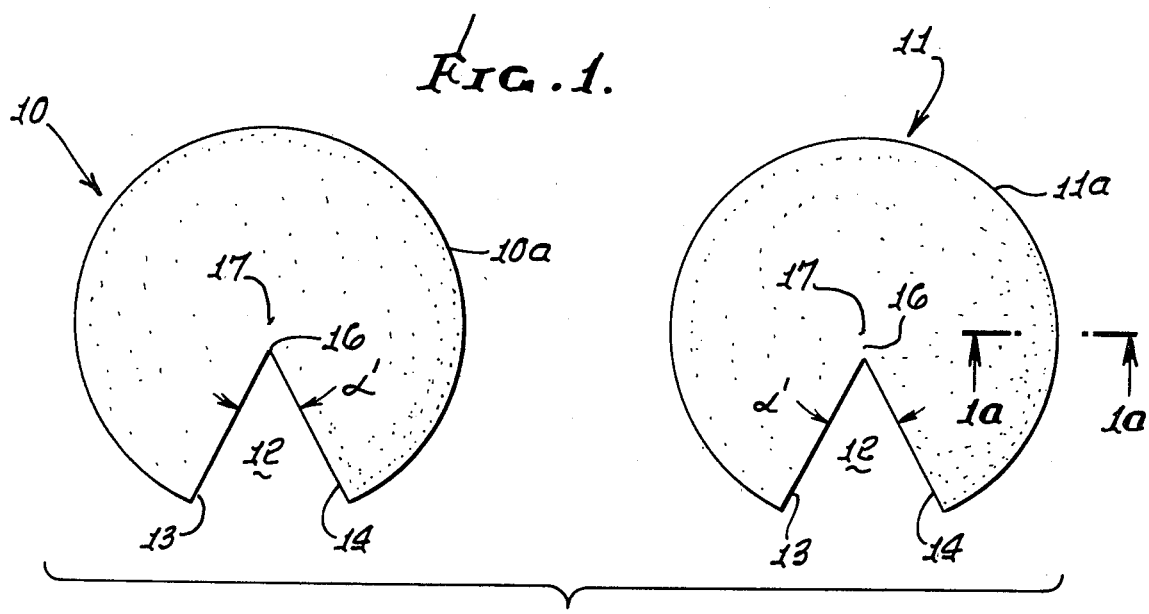
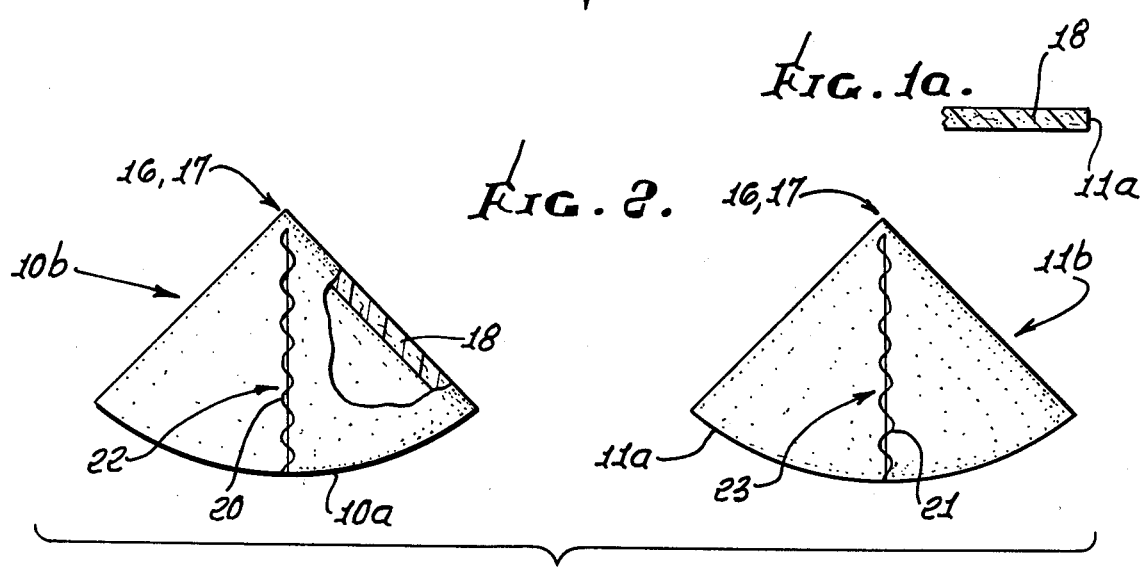
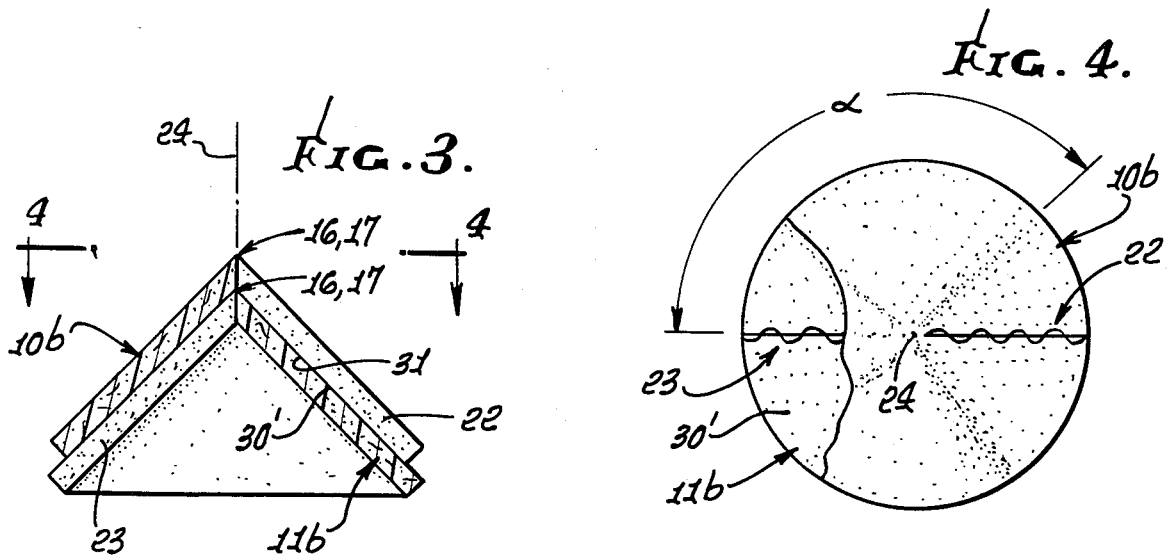

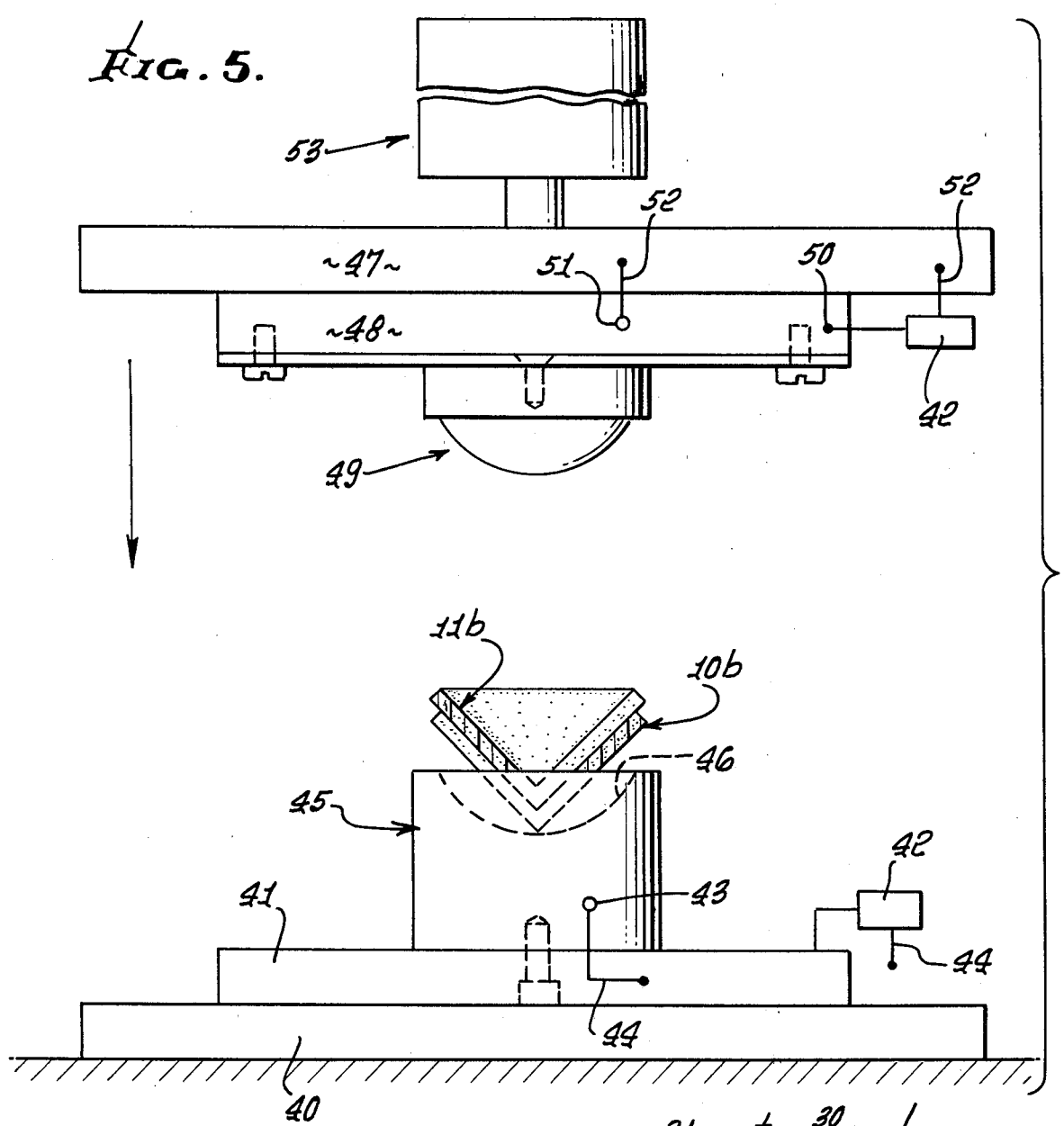
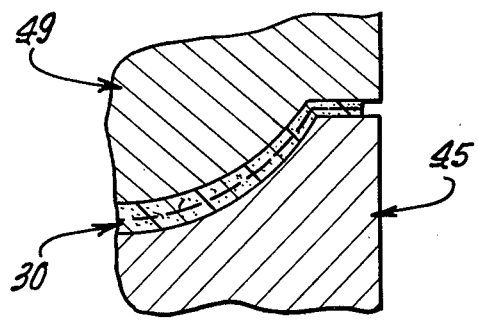
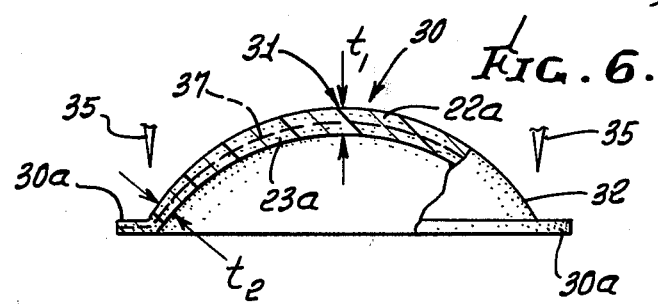
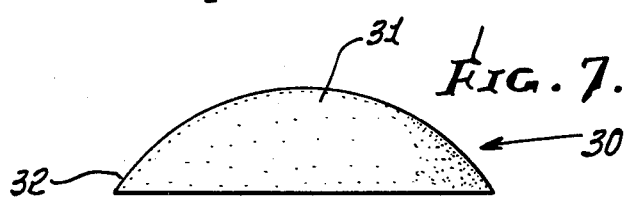

BRASSIERE PAD FABRICATION

BACKGROUND OF THE INVENTION

This invention relates generally to brassiere pads and their formation; and more particularly concern such pads formed from lightweight batting.

There is a continual need to produce brassiere pads rapidly, inexpensively, and to have integrated, lightweight and superior construction. The production and construction of prior pads of which I am aware lack the unusual advantages of the present invention which meet the above need, and which will appear from the following description. Among such advantages are the rapid formation of integrated pads from sheets of lightweight batting; the formation of cones from such batting to have seams, and the integration of such seams in nested, compressed and molded-together cones to provide distributed structural strength of the cones, whereby the seams do not separate during use.

SUMMARY OF THE INVENTION

It is a major object of the invention to provide an improved method of fabricating a brassiere pad, the method including the following steps:

(a) forming two sheetlike blanks with notches having diverging edges, the blanks consisting essentially of lightweight fibrous batting and thermoplastic resin intermediate the fibers, (b) connecting together said diverging edges of each blank thereby to form said blank into a cone having a seam extending between the apex and the periphery of the cone, (c) nesting the two cones so that the seam of one cone is effectively rotated more than 90° relative to the seam of the other cone, and about an axis passing through the apices of the cones, (d) applying heat and pressure to the nested cones to compress them against one another and substantially reduce their combined thickness, thereby effecting their interconnection through at least partial melting of said resin, to form the pad.

As will appear, the seam of one cone is typically rotated about 180° relative to the seam of the other cone, in nested condition and about an axis passing through the apices of the cones, so that upon molding optimum structural strength and integrity of the resultant pads is achieved. This is important in a pad having progressively decreasing thickness from the pad crest to the pad periphery.

In its apparatus aspects, the pad basically comprises:

(a) a dome shaped molded pad having thickness which progressively decreases from the crest of the dome toward the dome periphery, (b) the pad comprising compressed batting, the batting consisting of fibers and resin, (c) the pad having two seams, one of which extends from the pad crest to the pad periphery and is confined to a portion of the pad closest to said exterior surface, and the other of which extends from the pad crest to the pad periphery and is confined to an interior portion of the pad closest to said interior surface, said seams being angularly spaced relatively about an axis through said crest.

These and other objects and advantages of the invention, as well as the details of an illustrative embodiment, will be more fully understood from the following description and drawings, in which:

DRAWING DESCRIPTION

FIG. 1 is a plan view showing two blanks of batting;

FIG. 1a is a section taken on lines 1a—1a of FIG. 1;

FIG. 2 is a perspective showing two cones formed from the FIG. 1 blanks;

FIG. 3 is an elevation taken in section showing selective nesting of the two cones, for reinforcement purposes;

FIG. 4 is a plan view on lines 4—4 of FIG. 3;

FIG. 5 is an elevation showing molding apparatus, with the nested cones in position for molding;

FIG. 5a is a fragmentary section showing the closed position of the molding apparatus, with the nested cones fully compressed;

FIG. 6 is an elevation, taken in section showing a completed molded pad; and

FIG. 7 is an elevation showing the FIG. 6 pad after trimming.

DETAILED DESCRIPTION

FIG. 1 shows two generally circular sheetlike blanks 10 and 11 with wedge shaped notches 12 formed to have radially outwardly diverging edges 13 and 14. The angularity $\alpha'$ of the notches is typically between 15° and 60°. The apices 16 of the notches are typically close to or at the centers of the circular blanks. The blanks are typically formed from lightweight batting which consists of loosely packed fibers and thermoplastic resin seen in section at 18 in FIG. 1a. The batting may comprise, FIBERFIL consisting of short length of polyester fiber with an acrylic resin binder. The thickness of each blank is between ⅜ and 1 inches, and is preferably about ⅝ inches. The peripheries of the blanks appear at 10a and 11a.

FIG. 2 shows the steps of forming the two flanks into cones 10b and 11b, as by drawing the notch edges 13 and 14 into close adjacency, and interconnecting them as by loose stitching 20 and 21. The seams formed by the drawn together edges and stitching are generally indicated at 22 and 23. Such seams extend along the slant heights of the cones, between the apice or centers 16 and 17, and the outer edges 10a and 11a; the thread to be used for stitching may consist of polyester core cotton wrap.

Next, the two cones are nested together as seen in FIG. 3, so that one cone penetrates the other, with their apices or centers generally in alignment, and defining an axis 24. Note that the upper surface 30' of cone 11b is brought into engagement or near engagement with the under surface 31 of cone 10b. Also, the nesting is effected to ensure that the seam of one cone is effectively rotated relative to the seam of the other cone, as for example about axis 24 or a similar axis. Such relative rotation or angularity is indicated by the angle $\alpha$ in FIG. 4, and preferably $\alpha$ should be about 180° for optimum strengthening purposes as will appear. The angle $\alpha$ is typically measured between a first plane defined by axis 24 and seam 23, and a second plane defined by axis 24 and seam 22; however, if the seams are curved, the defined planes are those which intersect the seams at corresponding locations.

Finally, heat and pressure are applied to the nested cones as during molding to compress them against one another and substantially reduce their combined thickness, so as to effect interconnection of the cones through at least partial melting of the resin, to form a single, dome shaped pad shown at 30 in FIGS. 6 and 7.

Typically, the step is carried out to control:

(a) the density of the pad 30 to be substantially greater than the density of each blank 10 and 11, and (b) the flexibility of the pad 30 to be substantially less than the flexibility of each cone 10b and 11b.

Further, molding is carried out to shape the pad as in FIG. 6, i.e. to have maximum thickness "t" (for example about ⅜ inch) at the apex region 31 and to have progressively decreasing thickness from region 31 in all directions toward the pad periphery 32 in FIG. 7, i.e. to have minimum thickness $t_2$ at that periphery, i.e. $t_1 > t_2$. A trimming step is also carried out as by use of cutter 35 (seen in FIG. 6) to trim off the peripheral flash 30a bounding the pad.

A further aspect of the method and of the resultant pad has to do with strengthening of the resultant pad through location of the seams with angularity $\alpha$ as described above. Those seams are compressed during molding, and since they are separated by angle $\alpha$, and preferably about 180°, any weakness to the pad structure, associated with either compressed seam, is minimized due to the angular separation of the seams; and enhanced strength associated with either seam due to the stitching is distributed about the pad 30, again as a result of the angular separation of the seams. See in this regard FIG. 6 wherein the partial section shown is taken through the loci of the two seams. Broken line 37 represents the bonded interface of the two cones; the bonded locus of the lower seam 23 (below lines 37) is indicated at 23a; and the bonded locus of the upper seam 22 is indicated (above line 37) at 22a. Seam locus 22a is strengthened due to bonding of that seam to the continuous upper surface 30 (see FIG. 3) of the lower cone 11b; and seam locus 23a is strengthened due to its bonding to the continuous lower surface 31 (see FIG. 3) of the upper cone 10b.

Referring now to FIGS. 5 and 5a, molding apparatus typically includes a lower fixed platen 40 carrying a heated platen 41, which may be suitably electrically heated via automatic control 42, as for example to between 360° F. and 450° F. A thermocouple, indicated at 43, is connected at 44 with control 42, to maintain the temperature of the platen 41. Heat flows into female mold block 45 which receives the two cones of FIG. 3, as shown, in recess 46.

An upper, moving platen 47 carries a heated platen 48, which in turn carries male mold block 49. The latter receives heat from platen 48. Control 42 is also connected at 50 with platen 48 to heat same to between 360° F. and 450° F., and a thermocycle 51 connected at 52 to control 42 to maintain the platen temperature.

When one cylinder 53 lowers mold 49 to the position seen in FIG. 5a, and close to mold 45, the nested batting cones 10b and 11b are compressed to the dome shape shown in FIGS. 5a and 6. Heat flows into the compressed cones to effect melting of the resin and bonding of the cones to produce the pad.

The described seams may also be considered as edge-to-edge junctions.

The batting for blanks 10 and 11 may consist of about 75% fiber and about 25% resin. Also, heat curable resin is applied to the upper sides of the cones (as in FIG. 3) at the time of assembly of the cones to FIG. 3 for immediately subsequent molding, to assist in holding the final pad to shape (FIG. 7), while limiting resin penetration into the batting. The under side of the lower cone in FIG. 3 is free of applied resin, so that it and the adjacent inner portion of the pad remain soft, for comfort of the wearer.

I claim:

1. In the method of fabricating a brassiere pad, the steps that include:
    (a) forming two generally circular sheet like blanks with notches having diverging edges, the blanks consisting essentially of lightweight fibrous batting and thermoplastic resin intermediate the fibers,
    (b) connecting together said diverging edges of each blank thereby to form said blank into a cone having a seam extending between the apex and the periphery of the cone,
    (c) nesting the two cones into conical contact so that the seam of one cone is effectively rotated about 180° relative to the seam of the other cone, about an axis passing through the apices of the cones,
    (d) applying heat and pressure to the nested cones to compress them against one another and substantially reduce their combined thickness thereby effecting their interconnection through at least partial melting of said resin, to form the pad into the shape of a dome, and to increasingly reduce said combined thickness from the crest of the dome toward a looping periphery defined by the dome,
    (e) said connecting together of the diverging edges of a blank being accomplished by loosely stitching together portions of the blank adjacent said edges, by employing plastic thread.

2. The method of claim 1 wherein said (d) step is carried out to control the density and flexibility of the pad, said pad density being greater than the density of each blank, and said pad flexibility being less than the flexibility of each nested cone.

3. The method of claim 1 wherein the blank consists of FIBERFIL, and the stitching is effected using plastic thread.

4. The method of claim 1 wherein resin is applied on outer surface extent of at least one cone to assist in interconnecting the cones.

5. The method of claim 1 wherein said (d) step is carried out by molding the cones between male and female mold sections, the female section having a surface corresponding to the desired convex surface shape of the pad.

6. The method of claim 5 wherein said (d) step effects formation of flash joined to the pad periphery, and including the step of severing the flash from the pair periphery.

* * * * *